J. S. LODER.
LIQUID FUEL COMBUSTION APPARATUS.
APPLICATION FILED JAN. 26, 1914.

1,243,311. Patented Oct. 16, 1917.

Witnesses

Inventor
John S. Loder
By Foster Freeman Watson
Attorney

UNITED STATES PATENT OFFICE.

JOHN S. LODER, OF RENO, NEVADA.

LIQUID-FUEL-COMBUSTION APPARATUS.

1,243,311. Specification of Letters Patent. Patented Oct. 16, 1917.

Application filed January 26, 1914. Serial No. 814,431.

*To all whom it may concern:*

Be it known that I, JOHN S. LODER, a citizen of the United States, and resident of Reno, Washoe county, State of Nevada, have invented certain new and useful Improvements in Liquid-Fuel-Combustion Apparatus, of which the following is a specification.

My invention relates to an apparatus for utilizing liquid fuel in smelting furnaces and more particularly to a means for mechanically atomizing fuel oil to take the place of coke or carbonaceous fuels in shaft and other smelting furnaces.

Liquid fuel has been used in smelting furnaces, but, for various reasons, satisfactory results have not been obtained, due principally to improperly atomizing the fuel.

According to the present invention the liquid fuel and air are together introduced into a mechanical atomizing device operating at high speed, which also acts as a device for forcing the atomized fuel and air into the melting chamber of the furnace at the fusion zone.

Figure 1:
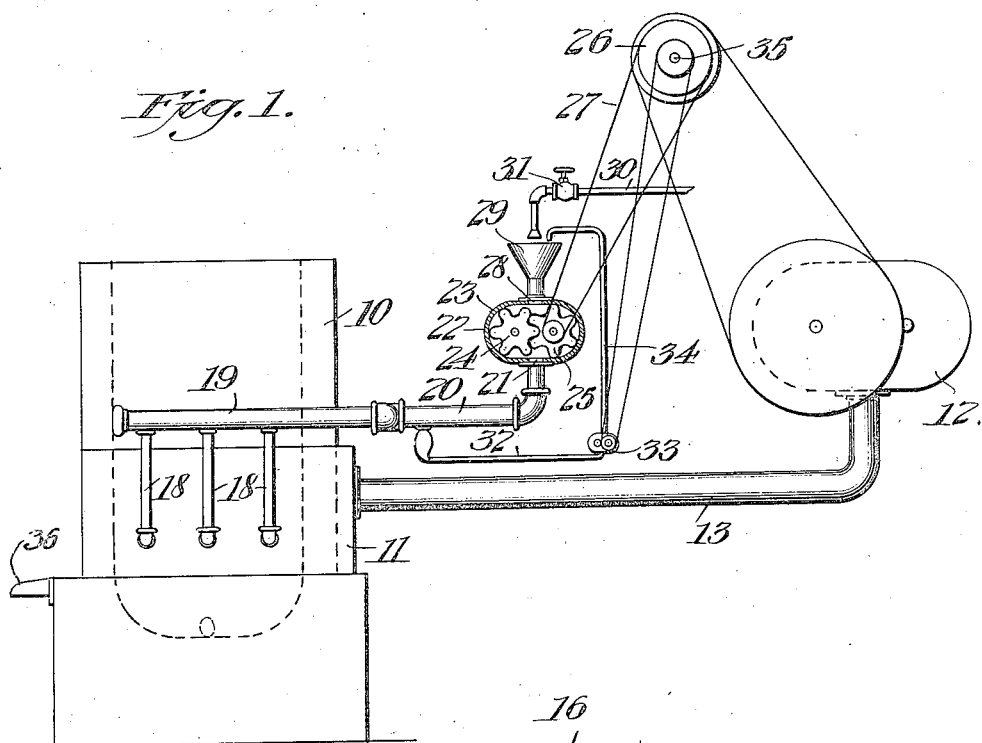
Figure 2:
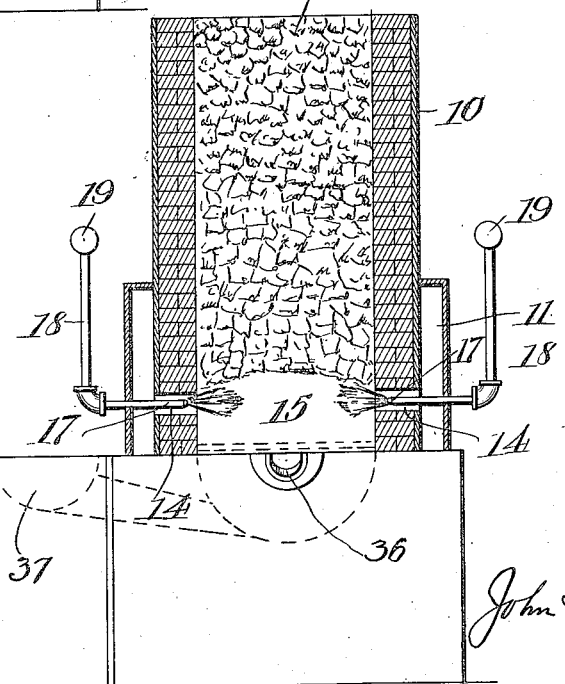

The objects and novel features of the invention will be apparent from the following description taken in connection with the drawing in which Figure 1 is a view of the apparatus for vaporizing fuel and the furnace to which it is connected;

Fig. 2 is a vertical central sectional view of the furnace showing the connection of the pipes thereto.

Referring to the drawings, 10 designates an ordinary shaft furnace which may be provided with a suitable water jacket to incase the lower part or matting zone of the furnace. An air jacket 11 is disposed on opposite sides near the lower end or fusion zone of the furnace and is supplied with air under pressure by means of the blower 12, which is connected thereto by the pipe 13. The twyers 14 in the walls of the furnace 10 admit the air from the air jacket 11 to the melting chamber 15 of the furnace.

The charge 16 of precious metal ores is introduced at the top of the furnace and to the same one per cent. or more of carbonaceous fuel may be added. Smelting ore by this method is more satisfactorily carried on in a shaft furnace than in a reverberatory furnace because in the latter furnace the heat must pass over the ore charge in order to produce a liquid of the blended products.

The gases from the reverberatory furnace leave the furnace at a temperature of approximately 1,000°, whereas in the shaft furnace the escaping gases seldom run over 100°, thus showing a greater economy in smelting in shaft furnaces. Furthermore, the fusion zone of the shaft furnace is at the bottom and the products of combustion pass through the over-lying ore charge as they ascend to the stack and the ore or blended products are gradually fed downwardly as they are smelted. The depth of the ore charge in the shaft furnace is from 14 to 20 feet and the escaping gases that pass therethrough are reduced to the temperature of the atmosphere, or nearly so, and at the same time prepare the descending ore charge for fusion by removing sulfur, arsenic and carbonic acid gas.

The apparatus for supplying the liquid fuel to the fusion zone of the furnace comprises a series of nozzles 17 which extend into and discharge through the twyers 14, thus simultaneously carrying air and fuel into the furnace to smelt the ore. By means of individual pipes 18 the banks of nozzles are connected to common pipes 19 on opposite sides of the furnace which unite in the single pipe 20. The pipe 20 leads to the outlet opening 21 of a high speed mechanical mixing, atomizing and forcing device 22.

The atomizing device 22 comprises a casing 23 inclosing a pair of meshing toothed wheels 24 and 25, the latter being driven in any suitable manner, as by means of the pulley 26 and belt 27. The casing 23 is provided with an inlet opening 28 opposite the outlet 21. A funnel-shaped pipe 29 is secured to the casing 23 to feed into the inlet 28. Oil or other liquid fuel is fed to the funnel 29 and casing 23 through the pipe 30 which is provided with a cut-off valve 31 to regulate the flow of oil into the casing 23. The end of the funnel-shaped pipe 29, being open around the discharge end of the pipe, serves to admit air as well as oil into the casing 23.

On account of the very high speed at which the two toothed wheels 24 and 25 are driven, the oil is broken up, atomized and simultaneously mixed with air. The mechanical device 22 also serves as a blower to introduce the mixture of air and atomized oil into the furnace under pressure through the nozzles 17.

A pipe 32 is connected to the pipe 20 and to a pump 33 so that any oil not atomized by the blower 22 may be returned by the pump 33 from the pipe 20 to the funnel pipe 29 through the pipe 34 which discharges into the said funnel pipe. The pump 33, as well as the blower 12, is connected with the drive shaft 35 or may be driven by other suitable means.

From the foregoing description it will be seen that I have provided a suitable high speed mechanical device by means of which oil or any suitable liquid fuel may be atomized, mixed with air and introduced under pressure at the fusion zone of a shaft furnace to develop the heat required in smelting operations, thereby doing away with coke which is now generally used. The principal objection to coke is that it usually contains silica and takes both iron and lime to slag off. Furthermore, on account of its bulk the use of coke reduces the capacity of the furnace by about 20%. By using oil neither of the above objections is met with and I have found that the cost of smelting is thereby reduced more than 50%. The operation of the furnace may be continuous and the slag being drawn off through the slag spout 36 while the metals, being of greater specific gravity, may settle to the bottom and may be ladeled out of the outside crucible 37.

Having thus described my invention what I claim is:

1. The combination with a device for utilizing liquid fuel, said device having a vertical combustion chamber provided with inlets at its fusion zone for atomized liquid fuel and air and an outlet for molten material at its lower end below said inlets, of an air jacket surrounding the fusion zone of said combustion chamber and having air outlets communicating with the aforesaid inlets, nozzles discharging atomized liquid fuel through said inlets into said combustion chamber at the fusion zone thereof, means for supplying air under pressure to said air jacket, said air in said jacket being heated by heat from said combustion chamber and the heated air entering said combustion chamber through said inlets, and means for atomizing liquid fuel, simultaneously mixing air therewith and supplying said atomized fuel to said nozzles under pressure.

2. In a device of the class described, the combination of a casing having an inlet for air and liquid fuel, and a mixture outlet, a pair of interfitting rotatable members in said casing between said inlet and outlet, said casing closely fitting said members on all sides, said members being designed to break up the liquid fuel, mix air therewith and deliver the mixture under pressure at the outlet, and means for driving said members.

In testimony whereof I affix my signature in presence of two witnesses.

JOHN S. LODER.

Witnesses:
ETHEL I. PARKER,
GEORGE SPRINGMEYER.